July 11, 1961
J. E. SNOW
2,991,850
ARRESTOR BRAKE
Filed July 10, 1957
6 Sheets-Sheet 1
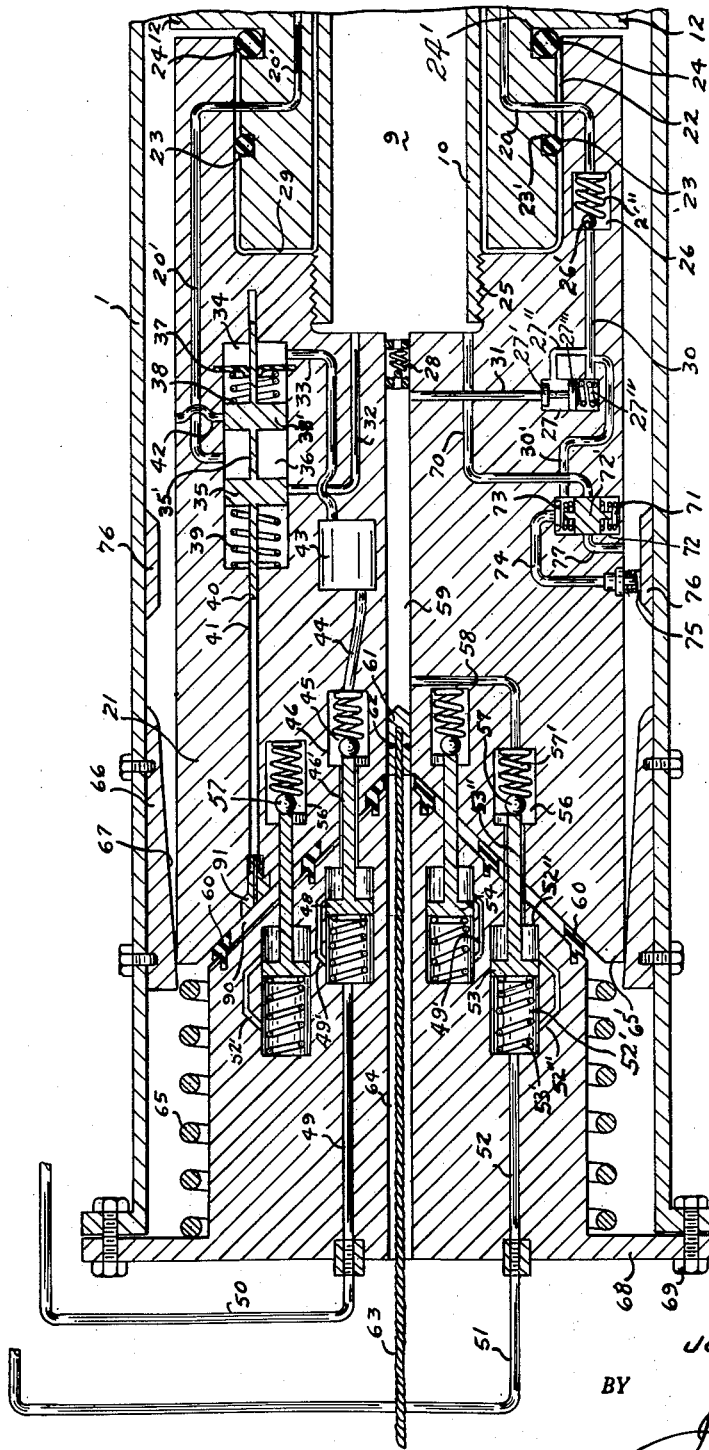
INVENTOR.
JOHN E. SNOW
BY
John B. Brady
ATTORNEY

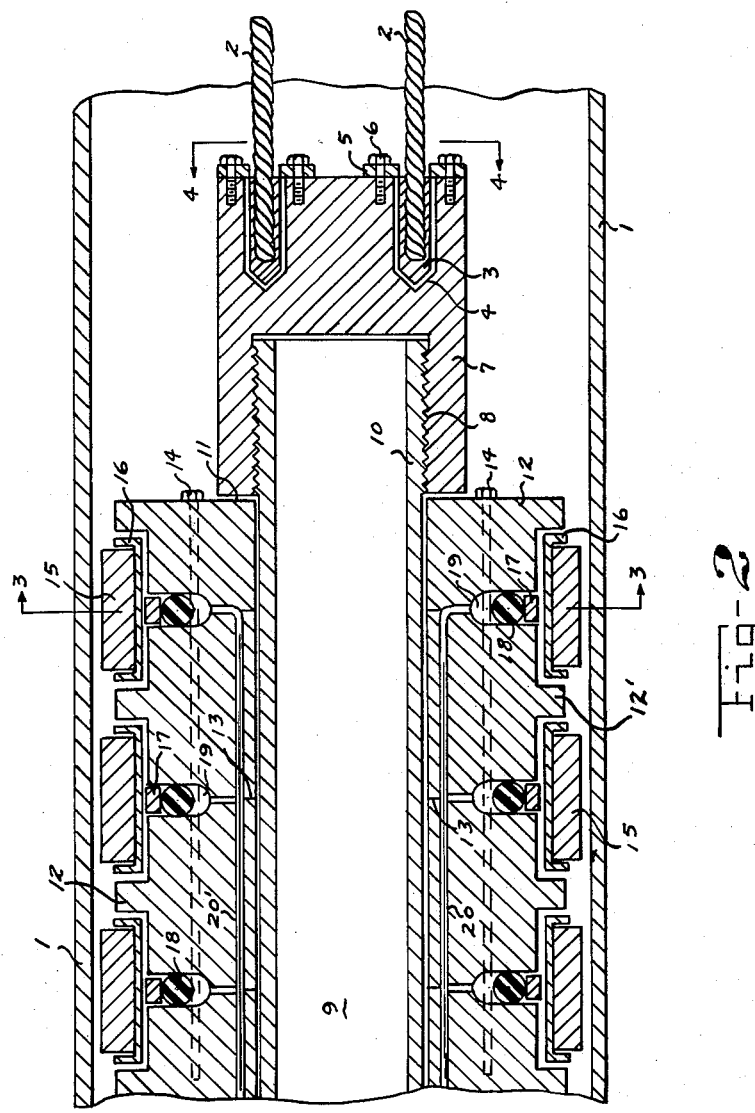

July 11, 1961 J. E. SNOW 2,991,850
ARRESTOR BRAKE
Filed July 10, 1957 6 Sheets-Sheet 3
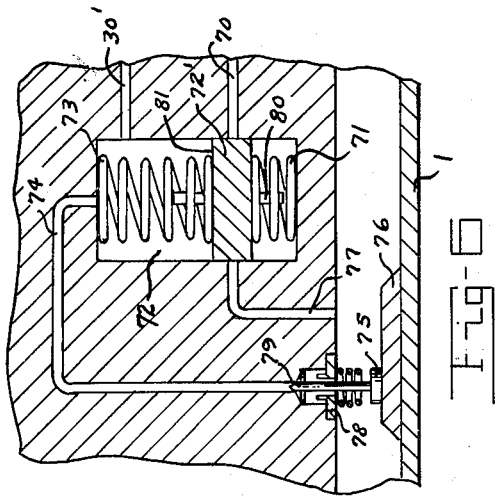
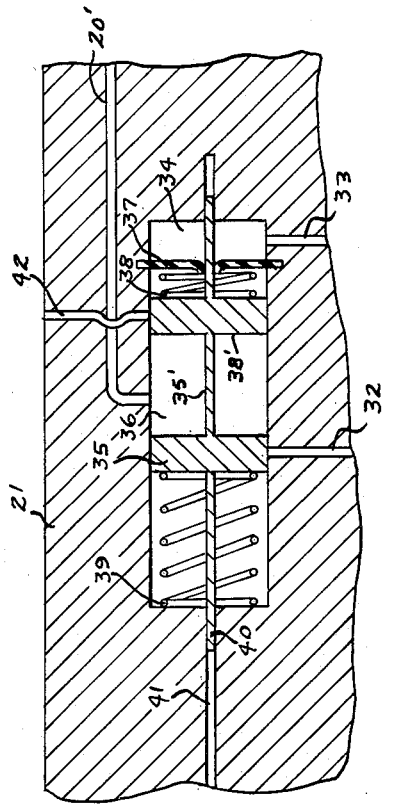
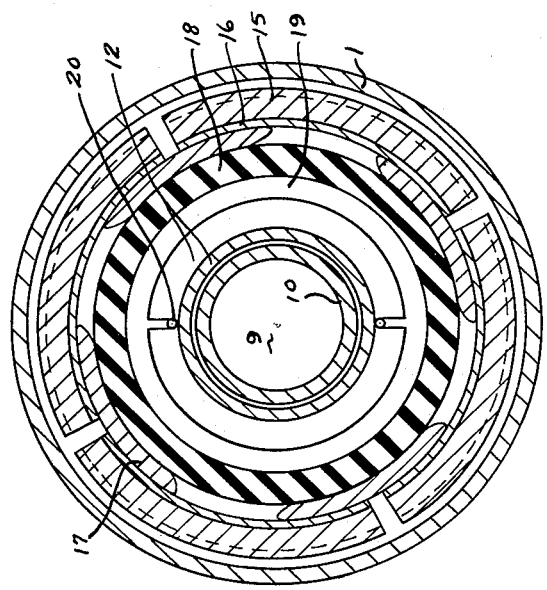
INVENTOR.
JOHN E. SNOW
BY
John B. Brady
ATTORNEY July 11, 1961
J. E. SNOW
2,991,850
ARRESTOR BRAKE
Filed July 10, 1957
6 Sheets-Sheet 4
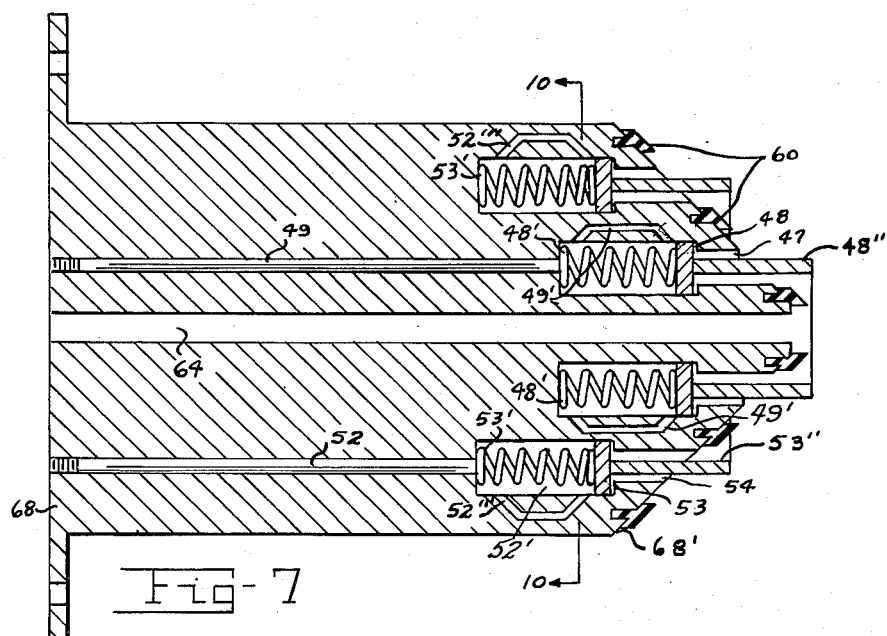
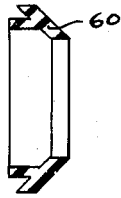
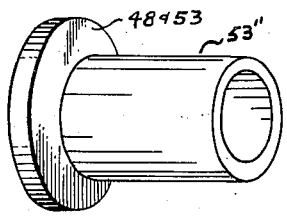
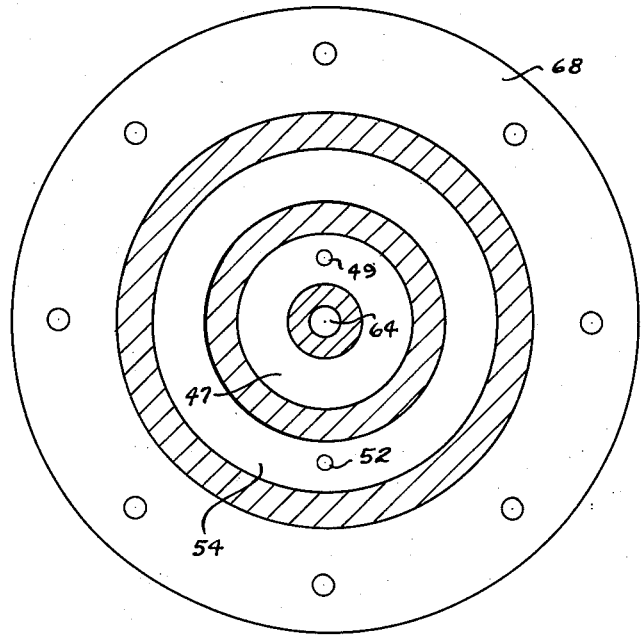
INVENTOR.
JOHN E. SNOW
BY John B. Brady
ATTORNEY July 11, 1961     J. E. SNOW     2,991,850
ARRESTOR BRAKE Filed July 10, 1957     6 Sheets-Sheet 5

INVENTOR.
JOHN E. SNOW

BY John B. Brady
ATTORNEY

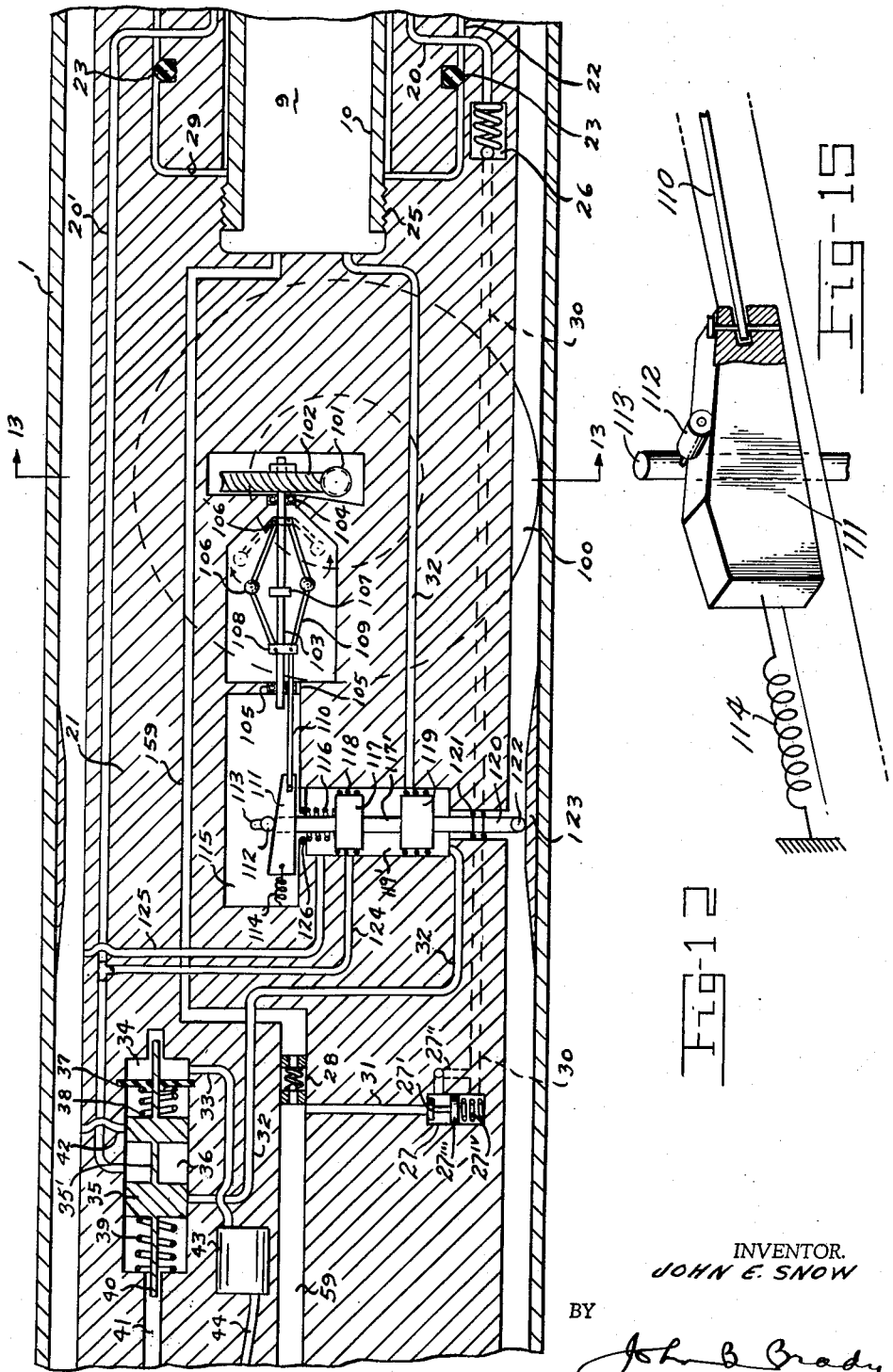

United States Patent Office 2,991,850
Patented July 11, 1961

2,991,850
ARRESTOR BRAKE
John Edward Snow, Fairborn, Ohio
(Thornwood Road, Armonk, N.Y.)
Filed July 10, 1957, Ser. No. 671,088
9 Claims. (Cl. 188—151)

My invention relates to that class of devices known as energy absorbers and more particularly to friction-brake energy absorbers.

My invention is particularly useful in arresting the forward motion of an aircraft during emergency landing or during an abortive take-off. It has many other uses, but I shall describe my invention as applied to an arrestor brake for use in an aircraft barrier system.

My invention is an improvement over my co-pending application, Serial Number 532,718, filed September 6, 1955, now Patent 2,814,365, dated Nov. 26, 1957. I have found it desirable to provide an arrestor brake which operates inside a drag tube and is pulled through the drag tube by arrestor cables engaged to the aircraft for that purpose.

Various pistons and plugs have been developed for the above purpose but I have found in practice that some means of adjusting the brake pressure during travel of the brake assembly through the tube is necessary. The travel of the brake assembly as it is pulled through the tube is called "run-out."

During run-out the operating conditions do not remain static. If the aircraft is lighter than expected or heavier than expected, the run-out may be too fast or too slow. Sometimes dirt or rust inside the drag tube causes excessive deceleration due to the brake shoes catching and forcing the aircraft to decelerate too rapidly. This is likely to cause damage to the aircraft and pilot. On the other hand, if the aircraft does not decelerate at the proper speed, the brake is not functioning properly and the aircraft may run off the runway or damage the equipment at the end of the run-out.

Accordingly, I have discovered a means of permitting the brake to adjust for the various working conditions encountered during run-out.

It is the principal object of my invention to provide an acceleration responsive internal supply of fluid under pressure in an energy absorber.

It is a further object of my invention to provide a deceleration responsive internal fluid escape in an energy absorber.

It is a further object of my invention to provide an internal storage to store fluid under pressure in an energy absorber.

It is a further object of my invention to provide an externally supplied means within an energy absorber to pre-set the initial pressure of brakes against the inner side of a drag tube.

It is a further object of my invention to provide within an energy absorber actuated by fluid under pressure, means responsive to elapsed time, to exhaust the fluid pressure.

It is a still further object of my invention to provide in an energy absorber, friction means mounted on a brake assembly internally supplied by fluid under pressure to actuate the friction means with the fluid being carried by the brake assembly and being fed to the friction means responsive to acceleration and being bled off away from the friction means responsive to deceleration and means to exhaust the fluid pressure at the completion of run-out.

My means of accomplishing the foregoing objects may be more readily apprehended by having reference to the accompanying drawings in which:

FIGS. 1 and 2 comprise a horizontal sectional view of my invention;

FIG. 3 is a vertical sectional view taken along lines 3—3 of FIG. 2;

FIG. 4 is a vertical sectional view taken along lines 4—4 of FIG. 2;

FIG. 5 is a detail sectional view of my deceleration control means;

FIG. 6 is a detail sectional view of my time metering means for dumping fluid pressure from within the piston;

FIG. 7 is a horizontal sectional view of my fixed probe;

FIG. 8 is an isometric view of my plate valves;

FIG. 9 is a horizontal sectional view of my sealing strips;

FIG. 10 is a vertical sectional view taken on lines 10—10 of FIG. 7;

FIG. 12 is a detail view, partly in section, of a modification of my decelerating control means;

FIG. 15 is a fragmentary perspective view of the cam actuated control means employed in the mechanism of my invention and illustrated on a larger scale than that shown in FIG. 12.

Similar numerals refer to similar parts throughout the specification.

Figure 13:
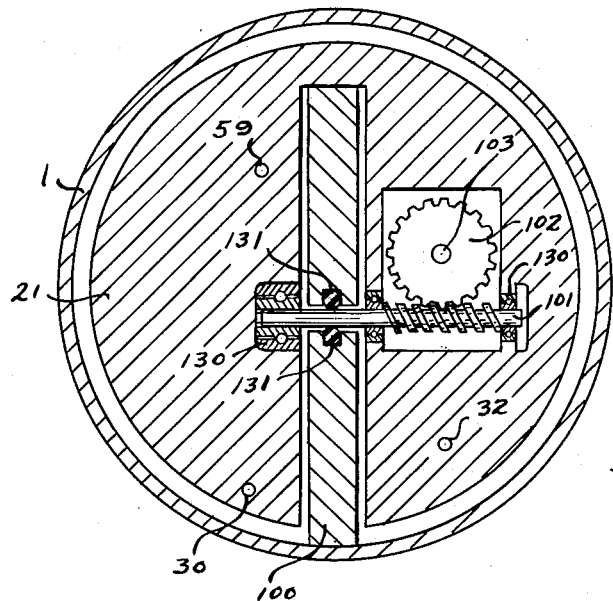
FIG. 13 is a vertical sectional view taken on lines 13—13 of FIG. 12.

My invention, as shown in FIGS. 1 and 2, comprise a drag tube 1 inside of which I place a brake body 21. At one end of the drag tube 1, I mount a fixed probe 68 around which I position a heavy buffer spring 65. I provide a finned cylinder 12 which may be bolted or otherwise attached to the brake body as shown. Together these form a brake. The finned cylinder 12 is formed by a cylindrical tube 10, threaded at both ends externally as indicated by threads 8 and 25, around which I mount segments 12' bolted together by studs 14 as shown. The threads 25 in the cylindrical tube 10 are meshed with corresponding threads of the brake body 21 as shown. The threads 8 provide means for the arresting cable cap 7 to be firmly attached. A return cable 63 may be inserted into the plug 61 and held firmly by swaging or crimping as at 62. The plug 61 may be firmly held in the internal passage 59 of the brake body 21 as shown.

When the segments 12' are assembled and held against each other in position as shown at 13, the finned cylinder 12 is formed and provides annular recesses for the expanders 18, overlap plates 17, and brake lining segmented shoes 16, which hold the brake lining 15 substantially as shown in FIG. 2 and FIG. 3. This arrangement prevents any portion of the expanders 18 from being extruded between the spaced extremities of the segmented shoes 16.

In each of the segments 12' I provide passages 20 and these form a continuous passage 20 when the segments 12 are bolted together as shown.

To obviate the necessity of the finned cylinder 12 being fluid pressure tight in its relation to the brake body 21, where the fluid passage 20 joins, I provide O rings 23 and 24 mounted in recesses 23' and 24' respectively. As shown in FIG. 2 and FIG. 4 the arresting cable 2, which may be a dual or single mounting, may be swaged at its ends into a drilled plug 3. The plug 3 may be held in the recess 4 by bolts 6 which hold the flange 5 in such a manner as to prevent any release of the arresting cable 2 as it pulls my brake through the drag tube 1.

It will be clear from my drawings that the brake body 21 has its rear end formed into a cone and that the fixed probe 68 has its forward end adapted to substantially mate in this cone. I provide sealing strips 60 which space the probe 68 and the brake body 21 when they are held together by means of tension placed on the return cable 63. My brake is ready to be charged in this position. The buffer spring 65 is adapted to be depressed by the outer edge 65' of the brake body 21 and thus absorb the shock occasioned by the rearward movement of the brake body 21 being halted by the probe 68. I provide a cam collar 66 mounted inside the drag tube 1 so that the cam surface 67 centers the brake body 21 as it is drawn into charging position.

One of the main advantages of this improvement over my previous invention lies in the fact that I provide that fluid pressure may be charged into the brake and thus "set" the brake pressure, while additional fluid under high pressure may be carried by the brake itself. In this manner, I provide that some fluid pressure may be passed into the system as required if acceleration is too rapid. Also, I provide that, at the end of run-out, the system will automatically be emptied of fluid pressure to enable the brake to be returned to its charging position.

Referring to FIGS. 1 and 2, I provide an external source of fluid pressure such as air pressure which enters the fixed probe 68 through line 51, internal passage 52 to an annular chamber 52'. In the chamber 52', I provide a plate valve 53 which is urged against the shoulder 52" by a spring 53'. The shank 53" of the plate valve 53 normally extends beyond the outer edge 68' of the probe 68 as clearly shown in FIG. 7. I provide a by-pass 52''' for insuring a passage for fluid when plate 53 uncovers passage 54.

As disclosed in FIG. 1, I provide a similar annular chamber 56 in the brake body 21, adapted to permit the entrance of the shank 53" of the plate valve 53 when the brake assembly is in a charging position. I provide a ball check 57 in the chamber 56 which comprises a ball 57 urged by a spring 57'. It is clear that unless the spring 57' is compressed by the shank 53" of the plate valve 53, the ball check 57 will seal the chamber 56. Accordingly, by calibration, the strength of the spring 53' and the spring 57' may be adjusted so that the plate valve 53 will uncover the by-pass 52''' and the ball check 57 will open the chamber 56 permitting fluid under pressure to pass into the brake body 21.

I provide a passage 58 leading from the chamber 56 to a drilled passage 59 in the brake body 21. A ball check valve 28 in the passage 59 permits entry of fluid into the accumulator 9 formed by the tube 10 being mounted and sealed as shown.

I provide a passage 31 which permits fluid to pass from passage 59 into a pre-load regulating valve 27. I prefer to use a standard commercial pressure reducing valve which is merely the usual spring-loaded diaphragm poppet valve readily available on the commercial market. As will be seen from the drawings, I provide a passage 30 from the outlet side of the valve 27 which connects through a ball check chamber 26 to the internal fluid pressure line 20. In the chamber 26 I mount a ball check 26' urged against the passage 30 by a spring 26". The strength of the spring 26" determines the pressure to be forced into the passage 30 to open the passages 20 to receive more fluid pressure and seals the pressure in the lines 20.

At this point I shall describe that portion of my invention relating to pre-setting the brakes to proivde an initial brake drag prior to run-out: The fluid pressure passes through passage 52 to the passage 58 when the system is in a charging position as shown in FIG. 1. Thence, the fluid pressure passes through passage 59 and the ball check 28 into the accumulator 9. However, since this fluid pressure is relatively high pressure of approximately 1500 p.s.i., it is desirable to have less than this pressure exerted against the inside of the drag tube 1 initially before run-out of the brake is started. For this purpose I provide the passage 31 which permits fluid pressure to pass to the pre-load regulating valve 27. Valve 27, as shown in the acompanying drawings, comprises a valve head 27' which closes the opening of passage 31 into the valve when the combination of back pressure from passage 30 on the valve head 27' and the force of spring 27$^{iv}$ equal or are greater than the pressure in passage 31. When valve 27 is open, fluid passes from the passage 31 to the outlet passage 27" to passage 30. Passage 30 connects also to the chamber of valve 27 below the piston 27''' on which the spring 27$^{iv}$ bears, in order to equalize back pressures on piston 27'''. As noted above, I prefer to use a standard commercial pressure reducing valve and the structure illustrated is for example only. This valve 27 is calibrated to reduce fluid pressure from approximately 1500 p.s.i. to approximately 200 p.s.i. It is this reduced fluid presure which is passed through passage 30 through the chamber 26 to the passage 20 and is ultimately exerted against the expanders 18 which press the brake lining 15 against the inside of the drag tube 1.

Having described the pre-setting features of my invention, I shall now describe the manner in which full fluid pressure is exerted against the expanders 18 during run-out: At the initial point before run-out commences, the space 19 (FIGURE 3) is filled with low pressure fluid passing from the passage 20. The high fluid pressure in the accumulator 9 cannot pass into the passage 20' because the passage 32 (FIGURE 1) is blocked by a piston 35, operating in the cavity 36. I prefer to call this assembly a deceleration control valve since it is designed to pass fluid pressure to exert sufficient braking force to decelerate the aircraft causing the run-out. As explained above, one of the problems encountered in this type of braking system is that while optimum conditions will require only one predetermined certain brake shoe pressure, in practice one may encounter rust and dirt inside the drag tube 1 which will cause the brake force to become excessive due to the brake shoes "grabbing." While I have found it is not always necessary to have a deceleration control valve, if necessary, my valve arrangement provides a means whereby brake force can be instantly lessened to provide for the smooth passage of the brake at the same time exerting necessary drag against the arresting cables run-out. Also, with a deceleration control valve system, when the rusty or dirty spots are passed, additional fluid pressure must be exerted against the expanders 18 to compensate and to maintain as constant a drag as possible since the brake will otherwise tend to lessen its drag. Referring to the drawings, especially FIGS. 1 and 5, it will be seen that except for the piston 35, fluid pressure from the accumulator 9 would pass to the brakes through the passage 20'. Accordingly, I provide the decelerating control valve 35', operating in the cavity 36. In order to control the lateral movement of the valve, I provide that fluid pressure from an external source 50 be fed through the passage 49 and the plate valve 48 in the fixed probe 68 to the internal passage 44 in the brake body 21.

Having described one such plate valve system (valve 53) I need not describe the plate valve system 48 since they are similar. The by-pass tubes 52''' and 49' (FIG. 7) provide for the passage of the fluid when the plates 53 and 48 uncover the passages 54 and 47.

I provide a control pressure reservoir chamber 43 which connects the passage 44 to the passage 33 leading into one end of the cavity 36.

I mount a diaphragm 37 in the cavity 36 substantially as shown. It will be clear that fluid pressure passing into the reservoir 43 and trapped there by the ball check 45 during run-out, will cause the diaphragm 37 to urge the spring 38 against the piston 38'. The piston 38' is spaced from and joined to the piston 35 by the bar 40. Of course, these two pistons need not be spaced. Thus the deceleration control valve 35' is composed of the two pistons 35 and 38' operating in the cavity 36 with opposed forces exerted by fluid pressure in passage 41 connected with metering orifice 91 and the springs 39 against the spring 38.

When the system is at rest and fully charged, the deceleration control valve 35' is in the position shown in FIG. 5. The passage 32 adjacent piston 35, and the escape passage 42 are blocked. I provide that the piston 35 is placed under fluid pressure by means of a metering orifice 91 in the face of the cone which gets its fluid pressure from the passage formed between the sealing strips 60 as the fluid pressure is passed from the plate valve 53. This fluid fills the space and is permitted to pass through the metering orifice 91 during the charging operation. The fluid pressure passes from the orifice 91 through the passage 41 and as explained above, holds the control valve 35' in a static position, as shown in FIG. 5. However, as soon as run-out commences, the control valve 35' moves to the left and the orifice 91 bleeds the fluid pressure in the passage 41 as the piston 35 changes position. Of course, with proper brake lining construction, it may be possible to dispense with the necessity for a deceleration control since one of the purposes of the control is to accommodate the negative damping found inherent in some types of lining.

In operation, my deceleration control valve is essentially an inertial valve. I realize that I could provide many other valves which would work satisfactorily, such as an electrical system which would be responsive to changes in the rate of the forward movement of my brake and would feed information to proper conversion apparatus to perform as my inertial system here described. I have set forth a preferred control valve. As previously set forth, before run-out commences, the brake lining 15 is pressed against the inside of the drag tube 1 with a relatively low initial pressure. As soon as run-out commences, the control valve 35' tends to move to the left causing the piston 35 to uncover the passage 32 which connects with the high pressure fluid in the accumulator 9. This permits the maximum fluid pressure to be exerted through the passage 20' to the brake linings 15. If the pressure is excessive for any reason such as above described, or for the reason that the aircraft is exerting less than expected energy, the brake arrester will decelerate too rapidly causing the valve 35' to move to the right again sealing the passage 32. But this movement causes the piston 38' to uncover the escape passage 42 and permits fluid pressure from the passage 20' to escape. This causes pressure on the brake linings 15 to lessen.

Of course, after the rusty spots are passed or if the arrestor accelerates for any reason, the valve 35' again moves left, due to inertia and the predetermined pressure set in cavity 34, and the piston 35 uncovers the passage 32, permitting thereby more fluid pressure to be exerted on the brake linings 15 from the accumulator 9. In order to adjust the control for various deceleration rates, different pressures can be set in cavity 34. This changes the preload on spring 38. This, in turn, changes the deceleration value at which the piston 38' will uncover the escape passage 42. Thus the control can be selected for varying deceleration rates from an external source. By providing the diaphragm 37 and the reservoir 43, I use a pre-selected control pressure, operating against the piston 38' which permits the piston 35 to be moved substantially by predetermined or controlled inertia forces. The bleed controlled passage 41, once having been charged during the charging period, bleeds off the pressure as the piston 35 moves to the left. The spring 39 then becomes the sole mechanical force operating on the piston 35 in this direction except for inertia. Of course, when the piston 38' uncovers the escape passage 42, the piston 35 seals off the passage 32.

In practice, I have found it expedient to provide a means to dump all possible fluid pressure from the system at the end of run-out. In order to accomplish this, I provide a passage 70 which is charged directly from the accumulator 9 and terminates in the cavity 72. Another passage 30' connects the low pressure side of the valve 27 with the top of the cavity 72 substantially as shown. As shown in FIG. 6, a passage 74 leads to a metering valve 79. I prefer that the metering valve 79 operates in a suitable cavity 78 and is formed essentially by a metering pin 75 resting on a cam ring 76 when the brake body 21 is in a charging position. Upon the commencement of run-out, the metering pin 75 slides off the cam ring 76 and begins to permit a leak of fluid pressure through the metering valve 79. It will be clear that the high pressure passage 70 is sealed by the piston 72' when the spring 73 plus fluid pressure compress the spring 71. These springs are in equilibrium when the spring 73 is assisted by the fluid pressure from the passage 30' exerted on the upper side 81 of the piston 72' being equally resisted by the strength of the spring 71 exerted on the bottom side 80 of the piston 72'.

By correct calibration, the metering valve 79 can be constructed so that at a point of time exceeding that required to stop the aircraft, sufficient fluid pressure will have leaked past the valve 79 to reduce the capability of the spring 73 to hold the piston 72' in a position covering passage 70. As soon as the piston 72' rises to uncover the passage 70, all possible fluid pressure is exhausted through passage 77.

My drawings are illustrative of one preferred embodiment of my invention and are not intended to be manufacturing details of my method of forming the various passages inside the brake body 21 and the fixed probe 68. The finned cylinder 12 is assembled and functions substantially as I have described but I do not intend to be limited to any specific disclosure of drilling or otherwise providing fluid passages and valves.

Figure 11:
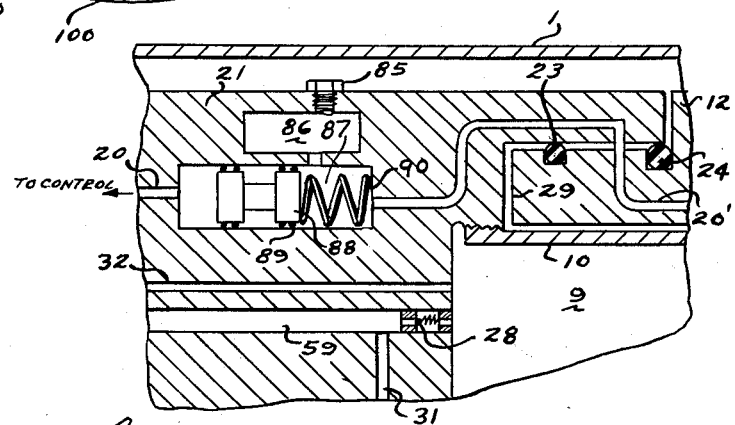
FIG. 11 is a detail view, partly in section, of a modification of my invention.

Many types of fluids may be employed in my invention to produce the fluid pressure necessary for my invention such as air, other gas, water, oil, or a solution of water and alcohol to charge the brake lines. I have found air and pneumatic pressure to be the most convenient. It is possible, by proper valve and servo-motor arrangements to provide a compressible fluid such as air or other gas in the accumulator and valves but use a substantially non-compressible hydraulic fluid such as water, alcohol or oil in the brake lines 20. To accomplish such an arrangement, I provide a piston and reservoir such as shown in FIG. 11 which function as a servo-motor placed in the high pressure line 20'. The arrangement I prefer and have disclosed in FIG. 11 operates as a booster for the fluid pressure in the line 20' from my deceleration control valve. I provide a hydraulic fluid reservoir 86 with a filler plug 85 mounted substantially as shown. A simple coupling arrangement such as the movable piston 88 operating in the cavity 87 supplied from the reservoir 86 and actuated by pneumatic pressure to exert hydraulic pressure may be provided. The piston 88 may be equipped with O rings 89 to provide seals and a spring 90 would provide the retracttile force. All of the passages 20' would then be filled with a substantially non-compressible fluid from the reservoir 86. If desired, a suitable clapper valve or other one-way valve (not shown) may be interposed on the fluid side of the cavity 87 to prevent any return of the fluid during the retractile movement of the piston 88 thus preventing a partial vacuum in the pressure lines. Instead of the O rings 89, a suitable cup washer may be substituted without departing from my invention.

In FIG. 12 I have disclosed a substitute for my timing valve piston 72' and its associated components. This is a set of velocity sensitive controls comprising mainly the elements designated 100 through 125 and shown generally between the finned cylinder 12 and the brake body 21 as a part of the brake body 21, eliminating the timing valve 79 and its associated parts.

In general, I provide a valve 119 in the high pressure line 32 and an escape passage 125 terminating in the cavity 119' where a passage 124 leading from the cavity 119' to the pressure line 20' provides an exhaust for the system.

My means of controlling the high pressure line 20' and the escape passage 125 is a pair of pistons 117 and 119 mounted on spindles 113, 117' and 120 substantially as shown. If the piston 117 uncovers the passage 124 by downward travel the brakes are depressurized. If the piston 119 uncovers the passage 32 by traveling in an upward direction the accumulator pressure flows into my deceleration control. In this form of my invention, I provide, as shown in FIG. 12, a governor wheel 100 adapted to rotate against the inside of the drag tube 1. The wheel 100 is mounted on a shaft 101 which in turn drives a governor gear 102. In practice I prefer to use worm gears. The gear 102 drives a governor shaft 103. I mount the shaft 103 in ball bearing races 104 and 105, substantially as shown. I connect the governor flyweights 106 by customary linkage 109 to a fixed collar 106' at one side and to a sliding collar 108 at the other side. Since the fixed collar 106' causes centrifugal force to act on the flyweights 106 when the shaft 103 is rotated by the governor gear 102, the sliding collar 108 reciprocates on the shaft 103 as its speed varies.

Figure 14:
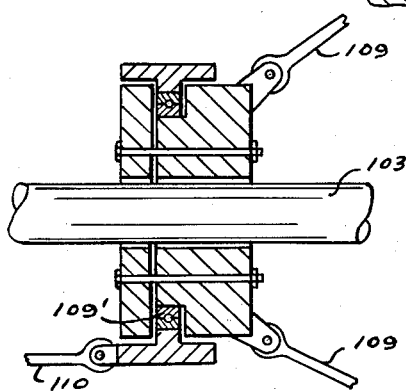
FIG. 14 is a detail view, partly in section, showing my sliding collar.

Referring to FIG. 14, I show a detail view of my method of mounting an actuator arm 110 on the collar 108. I provide a ball bearing collar 109' to reduce rotary motion due to torque.

I provide a fixed collar 107 which may be adjusted to any desired position and forms a stop for the axial movement of the sliding collar 108. The actuator arm 110 is attached at its other end to a cam 111. A spring 114 mounted as shown provides a retractile pull on the cam 111.

I provide a valve stem 113 attached to a piston 117. In the stem 113 I mount a roller 112 adapted to slide on the cam 111 substantially as shown. The piston 117 is positioned in a cavity 119' and is adapted to reciprocate therein. I provide O rings 118 to seal the piston in the cavity 119'. However, cup washers or any other suitable seals may be used for this purpose. Within the cavity 119' and spaced from the piston 117, I mount a second piston 119 on a spindle or valve stem 120. The two pistons 117 and 119 are mounted on the same spindle 117'. It will be apparent, however, that, if desired, the two pistons 117 and 119 could be formed in a single piston or two pistons not spaced apart. This is a matter of mechanical choice and has no particular significance so long as the functions of the respective pistons are performed.

I provide a cam collar 123 upon which a cam roller wheel 122 is mounted at the end of the spindle valve stem 120. I provide O rings 121 for sealing purposes. There are many forms of seals adaptable for the brake of my invention although I have shown only one illustrative form.

Referring to FIG. 12, my drawing discloses the system in the charging position awaiting engagement of the cables 2 with an aircraft.

The fluid pressurization previously described is almost identical.

The accumulator 9 is again charged through passage 59 which is routed around the governor control. Fluid under pressure again flows through the pressure reducing valve 27 and the passage 30 to pre-load the brakes.

The pressure in the accumulator 9 is prevented from passing to my deceleration control in the cavity 36 through the passage 32 because the piston 119 blocks the passage 32.

The reduced pressure in the brake lines 20 is retained by the piston 117 blocking the line 124 from the exhaust line 125.

The performance of my invention embodying my velocity sensitive control is briefly described as follows: Immediately upon the commencement of run-out, the brake body 21 separates from the fixed probe 68. All the valves and controls function as before. The deceleration control piston 35 is delayed in moving to the left by the pressure in the passage 41 escaping through the bleed valve 91. The line 32 which supplies fluid pressure to the deceleration control valve 35' is blocked by the governor control piston 119. The piston 119 will continue to block the passages 32 and 124 until the cam roller 122 rolls off the cam collar 123. When the cam roller 122 rolls off the cam collar 123, the action of the spring 116 biases the piston 117 and the piston 119 downwardly, in a position determined by the position of the roller 112 on cam 111. Almost immediately the governor flyweights 106 are set in motion and begin to pull the cam 111 to the right.

As the brake body 21 rapidly gains momentum by the increase in velocity of the run-out, the increase in the centrifugal force causes the cam 111 to move further to the right. This further movement of the cam 111 causes the piston 119 to uncover the passage 32 and permits my deceleration control valve 35' to receive the full pressure in a continuous flow as it demands from the accumulator 9.

As the brake body 21 and the aircraft approach the end of the run-out, both are decelerating rapidly. To ease the stop and to avoid any jerk in the deceleration cycle, it is desirable to ease or reduce the brake pressure by reducing the fluid pressure in the system. However, under ordinary conditions, if this were done, a resupply would be demanded by the deceleration control valve 35' and this would apply a sudden increase in the brake force at low speed and jerk the aircraft to a sudden stop. The damage to the aircraft and pilot under these circumstances is obvious.

I have, accordingly, provided that after the speed of the brake body 21 and of the aircraft has decreased to approximately 10 m.p.h., the control piston 119 again blocks the passage 32 and thus deceleration pressure is cut off from the deceleration control valve 35'. The deceleration control valve 35' then functions with the remaining pressure trapped in the passages 20.

Upon the aircraft and the brake body 21 coming to rest, the spring 114 pulls on the cam 111 with sufficient force to collapse the flyweights 106 and this permits the piston 117 to drop by means of the action of the spring 116, uncovering the passage 124 which exhausts the remaining fluid pressure in passage 20' through passage 125. The pressure in accumulator 9 is preserved by the blocking of passage 32 by piston 119.

The return cable 63 can now pull back the brake body 21 with the brake lining 15 released from pressure contact with the inside of the drag tube 1.

As shown in FIG. 13, I provide an override clutch 131 which permits the driving wheel 100 to idle out of mesh with the shaft 101 during the return travel of the brake body 21.

Upon arriving at the charging position shown in FIG. 12, the cam roller 122 again rides up upon the cam collar 123, properly setting the piston 119 for the charging operation. While I have shown and described a flyweight governor, it will be clear to those skilled in the art that any of a large number of arrangements would perform satisfactorily. For instance, I may provide that the driving gear 100 furnish rotary power to a pump or an electrical system which would function to actuate my controls.

Having described my invention, what is claimed is:

1. In a friction type energy absorber, a tube, a brake assembly movable axially within said tube and including fluid actuated friction means adapted for bearing under different pressures on the inner surfaces of said tube, an external source of fluid under pressure, a chamber within said brake assembly for accumulating a charge of fluid from said source at relatively high pressure, means for connecting said external source of fluid with said chamber when said brake assembly is at rest at one end of said tube and including two cut-off valves in said brake assembly, said cut-off valves being open during the charging of said chamber and operating to retain the charge in said chamber, means within said brake assembly and connected between said cut-off valves for connecting said external source of fluid to said fluid actuated friction means also when said brake assembly is at rest at said end of said tube, the last mentioned means including a pressure reducing valve in said brake assembly operating to allow fluid under relatively low pressure to force said friction means against said tube for initial movement of said brake assembly, and means within said brake assembly connected between said chamber and said fluid actuated friction means and responsive to acceleration forces during movement of said brake assembly to control the application of fluid from said chamber under relatively high pressure to force said friction means more strongly against said tube.

2. In a friction type energy absorber as set forth in claim 1, additional means associated with said last mentioned means and including a pressure escape passage for relieving said friction means from the relatively high pressure under negative acceleration forces, i.e., under deceleration of said brake assembly.

3. A friction type energy absorber as set forth in claim 1, and including means comprising a pressure escape passage and pressure release valve means operable at the end of movement of said brake assembly in said tube to relieve said fluid actuated friction means of all fluid pressure through said pressure escape passage and to allow free movement of said brake assembly within said tube.

4. A friction type energy absorber as set forth in claim 1, and including a fluid pressure control valve interposed between said chamber and said acceleration responsive means, and means dependent upon the velocity of movement of said brake assembly for controlling the position of said control valve, said control valve being operated to connect said chamber with said acceleration responsive means when said brake assembly has attained a certain velocity of movement.

5. A friction type energy absorber as set forth in claim 1, and including a fluid pressure control valve interposed between said chamber and said acceleration responsive means, a fluid pressure escape passage, a fluid pressure release valve interposed between said pressure escape passage and said fluid actuated friction means, and means dependent upon the velocity of movement of said brake assembly for controlling the positions of said control valve and said release valve, said control valve being operated to connect said chamber with said acceleration responsive means when said brake assembly has attained a certain velocity of movement, and said release valve being operated to connect said fluid actuated friction means with said fluid pressure escape passage near the end of movement of said brake assembly when the velocity of said brake assembly is less than that required to operate said control valve, the pressure in said chamber being preserved by said control valve when said fluid actuated friction means are connected to said fluid pressure escape passage.

6. A friction type energy absorber as set forth in claim 1 and including a second external source of fluid under pressure, a second chamber in said brake assembly, means including another cut-off valve in said brake assembly for connecting said second external source with said second chamber when said brake assembly is at rest at said end of said tube, and means connected with said acceleration responsive means and including said second chamber with fluid under pressure therein for delaying the operation of said acceleration responsive means for a predetermined time during the initial movement of said brake assembly with the last said cut-off valve closed.

7. In a friction type energy absorber, a tube, a brake assembly movable axially within said tube and including fluid actuated friction means adapted for bearing under different pressures on the inner surface of said tube, said fluid actuated friction means being maintained under relatively low pressure, a chamber within said brake assembly containing fluid under relatively high pressure, and inertia responsive means within said brake assembly connected between said chamber and said fluid actuated friction means for controlling the application of relatively high pressure to said friction means according to changes in velocity of said brake assembly.

8. In a friction type energy absorber as set forth in claim 7, wherein said chamber is a pneumatic pressure chamber containing compressed air, a reservoir of hydraulic fluid in said brake assembly, and a hydraulic servo-mechanism supplied with hydraulic fluid from said reservoir and actuated by said inertia responsive means to apply hydraulic pressure to said fluid actuated friction means.

9. A friction type energy absorber as set forth in claim 7 and including a pressure escape passage, a time delay pressure release valve normally closed with said brake assembly in a start position, said release valve being between said passage and said pressurized chamber and being timed to open a predetermined period after movement of said brake assembly from said start position.

References Cited in the file of this patent

UNITED STATES PATENTS

| | | |
|---|---|---|
| 875,759 | Whitcomb | Jan. 7, 1908 |
| 2,814,365 | Snow | Nov. 26, 1957 |